April 25, 1939.　　　M. L. SEVERY　　　2,155,741
APPARATUS FOR PRODUCING MUSIC SYNTHETICALLY
Filed Dec. 23, 1935　　　8 Sheets-Sheet 1

Inventor
Melvin L. Severy
By James A. G. Koehl
Attorney

April 25, 1939.　　　M. L. SEVERY　　　2,155,741
APPARATUS FOR PRODUCING MUSIC SYNTHETICALLY
Filed Dec. 23, 1935　　　8 Sheets-Sheet 2

| F#7　F#'s　F#1 | D#7　D#'s　D#1 | G#7　G#'s　G#1 |
|---|---|---|
| A7　A's　A1 | C#7　C#'s　C#1 | G7　G's　G1 |
| F7　F's　F1 | A#7　A#'s　A#1 | D7　D's　D1 |
| C7　C's　C1 | E7　E's　E1 | B7　B's　B1 |

Fig. 6

Inventor
Melvin L. Severy
By James A. G. Koehl
Attorney

April 25, 1939.  M. L. SEVERY  2,155,741
APPARATUS FOR PRODUCING MUSIC SYNTHETICALLY
Filed Dec. 23, 1935  8 Sheets-Sheet 3

Inventor
Melvin L. Severy
By James A. G. Koehl
Attorney

Fig. 9b

April 25, 1939.   M. L. SEVERY   2,155,741
APPARATUS FOR PRODUCING MUSIC SYNTHETICALLY
Filed Dec. 23, 1935    8 Sheets-Sheet 6

April 25, 1939.   M. L. SEVERY   2,155,741
APPARATUS FOR PRODUCING MUSIC SYNTHETICALLY
Filed Dec. 23, 1935.   8 Sheets-Sheet 7

Inventor
Melvin L. Severy
By James A. G. Koehl
Attorney

Patented Apr. 25, 1939

2,155,741

UNITED STATES PATENT OFFICE 2,155,741

APPARATUS FOR PRODUCING MUSIC SYNTHETICALLY

Melvin L. Severy, Los Angeles, Calif., assignor to The Vocalsevro Company of Chicago, Chicago, Ill., a corporation of Delaware Application December 23, 1935, Serial No. 55,773

13 Claims. (Cl. 84—1)

This invention relates to musical instruments, and more particularly to those in which relatively weak electrical impulses are produced to be later enlarged and converted into sound, and it has for one of its principal objects the production of a low cost instrument of a very high type of musical excellence.

Among the more dependable instruments of this class are those having formed annuli revolving at predetermined speeds in close proximity to pick-up devices, Patent No. 1,893,250, issued to me January 3, 1933, being an illustration of an instrument with "built-in" qualities, and Patent No. 1,941,870, issued to me January 2, 1934, illustrating a form of instrument with selectively adjustable qualities instantly changeable by, and responsive to, the action of tappets operated by the player in the familiar way.

In all instruments using formed annuli the utmost care must be exercised to rotate them at the correct speeds, and this, due to the incommensurate ratios of the tempered scale in common use, requires somewhat elaborate moving mechanism. Besides this, the annuli must be cut with the greatest care, and then mounted with the utmost possible accuracy. When the best attainable has been achieved in these regards, very pleasing results may be had, but the care and expense in attaining them are considerable, and when all is done that is possible along these lines, these results cannot be ideal by reason of the fact that there are certain insurmountable difficulties attendant upon such a method of procedure. A brief reference to a few of the major difficulties which are unavoidable in such instruments will make this plain.

Electronic enlargement magnifies the minutest defects into serious blemishes. The magnetized cores of the pick-up mechanisms must be so close to their associated revolving annuli, particularly where the "teeth" or crests are near together, that a fraction of a thousandth of an inch eccentricity, an almost invisible burr, or other malformation, will register in the greatly enlarged tone. After such matters are made as tolerable as possible by the most painstaking care, there remains the fact that, due to the fineness of the wave-forms, particularly those associated with the higher pitches, and the further fact that the core of the pick-up magnet does not act on a mathematical line parallel to the axis of motion of its associated annulus, there is a spreading out of the lines of force to a plurality of crests as well as a reaching down to the bottoms of a plurality of the necessarily shallow troughs all of which blurs the effect and defeats that clean-cut action necessary to a perfect sine wave. Comparison of tones produced in this way with those produced by a tuning fork illustrates forcefully the very considerable difference between the two tones. There is a smooth, round, ringing quality to the tone produced by a freely moving fork or a properly loaded reed which, while sensibly fundamental in quality, is yet more satisfyingly beautiful than the more artificial and somewhat forced results obtainable from the best annuli-generated wave-forms at present practicable.

The said freely moving fork or reed tone is simple or basic and would not be used without enrichment, except in the very simple and inexpensive forms of my invention. For the more complete forms, however, these sensibly fundamental tones lend themselves ideally to synthetic mixing, which is a very important part of my invention. Indeed, it is desirable that even the cheaper forms of the instrument shall have a variety of tone colors, and these should be instantly available to the player without interrupting the rhythm of his selection. In even a very moderately priced instrument, it should be possible to have an infinite variety of tonal changes from which a player may select and play upon instantly responsive tappets all that he may need in any recital, and this I accomplish, as will be explained later on.

Previous attempts to secure the results I have accomplished have been unsuccessful because of excessive cost, undependability of operation, and unsatisfactory musical results, due to many reasons, a few of which will now be explained for the better understanding of this present application.

Attempts have heretofore been made to vibrate forks by electromagnetic impulses controlled by the fork itself, after the manner of the familiar rheotome operating by direct current, suitably interrupted in step with the vibrational frequency of the fork, or some sub-multiple thereof. Where the attempt has been to make the keys of the manual start in each case their own associated forks (where a plurality of partials are used) each time they are pressed, the response of the forks has been too slow for musical needs. When this system has sought to build up tonal qualities synthetically (the pressing of a single key of the manual requiring the starting of six or more forks), the results have been so noticeably sluggish as to give a sense of deadness to everything rendered. Nor is this all. A grace note would not ordinarily be heard at all; a quarter note would perhaps be audible; a half note much louder, and a full note louder still, so that anything like proper musical expression would be defeated. There would also be other grave difficulties, but since these are common to the continually vibrated type, as hitherto used, they will now be explained in that connection. I will advert to them at once.

Continuously vibrated rheotomes, where the energizing current is direct and interrupted by the fork itself (commonly eighty-four rheotomes vibrating continuously), fill the vicinity of the pick-up magnets with such a mixture of dissonant inductive pulsations as will overbear the legitimate or pick-up impulses. Care must, therefore, be taken to eradicate such pulsations as far as possible, and this is difficult and expensive. There is also the familiar "pick" of each fork-vibrating magnet upon the metal of its armature, the fork, at each vibration, setting up microphonic perturbations in the fork. Where the fork makes and breaks a metallic contact, as is usually the case, the rattle of these contacts, and in turn their microphonic results, needs only the merest mention, when it is borne in mind that all these noises are to be magnified many hundreds of times. The distortion of forks so vibrated, and their general undependableness is well known by all those skilled in their use.

It has been proposed to remedy this unreliability by the continuous electromagnetic vibration of forks by timed alternating or direct current impulses delivered to the fork-energizing magnets by electrical generators or interrupters, one for each fork employed, and then to wind one leg of each fork with a coil supplied with current and opposed by a pick-up coil. The running of several scores of generators or interrupters, while it may ensure reliability of action, is expensive, and a coil and its two leads attached to one prong of each continuously vibrating fork could not fail to distort the tone even more than the inevitable distortion incident to a one-side energization of the fork. Besides this, such wires attached to a rapidly vibrating object are prone to crystallize and break off. The difficulties already adverted to of the setting up in the vicinity of the pick-up mechanism of almost infinitely complex fields of force apply most emphatically here.

The problem presented is, therefore, not a simple one. It will be seen from the foregoing that to attain or even nearly approach ideal conditions and results, a musical instrument of the type forming the basis of this application should have the following characteristics:

1. It should be capable of the artistic rendition of any and all compositions intended to be played by a single performer.
2. It should have a basic or fundamental tone of the sine-wave characteristics of the free unhampered fork or reed.
3. It should have provisions for selecting and synthetically combining these fundamental tones into a great number of tonal qualities.
4. A plurality of these different timbres should always be instantaneously available to the player without fumbling, or in any way interrupting the rhythm of his selection.
5. The attack of all tones should be instantaneous and the tones of constant volume from their inception, save when intentionally varied for expression, and not subject to building up according to their duration.
6. The instrument should be dependable in all ways.
7. It should be simple in construction, easily played, and its upkeep should be negligible.
8. All possible undesirable sounds should be avoided at the start and not merely more or less perfectly submerged in legitimate tone or expensively sound-proofed.
9. It should be moderate-priced, and even the smallest type should be of a volume amply sufficient to fill a large home.
10. It should lend itself easily to broadcasting and automatic operation.
11. It should eliminate at the start, so far as possible, all inductive coupling, "cross talk", and the like, which is expensive and troublesome to reduce even to a tolerable degree when present, thus reducing shielding to a minimum.
12. It should be compact, not easily put out of adjustment, and readily portable.
13. It should have an infinite variety of tone colors, using the word "infinite" in the sense, as defined hereinafter, of "impossible to exhaust".
14. The more elaborate types should have an infinite variety of timbres, with quickly operable, cheap, and dependable means for placing as many of these as may be desired at the instant command of the player by the mere touching of a tappet or its equivalent, and any or all of these should be readily changeable for other different qualities for as many times as can conceivably be desired.

Many of the most important objects of my invention, set forth above, I secure by the continuous vibration of forks, reeds, or the like, through the agency of air acting thereupon, thus eliminating entirely all fields of force save the necessary and legitimate ones created by associated pick-up devices. I may, of course, employ either air pressure or suction to vibrate my forks or reeds, but for illustration herein I have confined myself chiefly to the former.

In this way I also eliminate all microphonic noises which a magnet vibrating a fork or reed would set up therein, for the attraction of the magnetized core of the pick-up magnet is continuous and creates no such microphonic disturbances. The reeds or forks are preferably given non-resonant mountings, to the end that they shall make so little sound as to require a minimum of sound-proofing to quiet them, and this non-resonance also increases their efficiency, making it easier for them to vibrate vigorously.

In the drawings,

Figure 9a is a schematic end illustration of the sticker system and eight "generators" in partial relations, five of which are electrically connected with associated partial lines of the sticker system;

Figures 13-23, inclusive, and Figure 26 are views in detail of various alternative forms of generators;

Figure 23a is a diagrammatic view of the double-blade switch used in the circuit shown in Figure 10;

Figures 24 and 25 are detail views of a form of key contact system that may be used;

Figures 27-42, inclusive, are detail views of still further forms of generators.

In order to make the showing and explanation more easily comprehensible, I deal with but five partials including, of course, the fundamental as the first partial, and with but a single manual, but it is, nevertheless, to be distinctly understood that any reasonable number of partials may be, and more than five ordinarily would be, used, and the number of manuals may easily reach four or more in the more elaborate embodiments of my invention.

I show herein a single manual instrument of seven octaves, extending from and including the note C of 32.33 vibrations per second to and including the note B of 3906.17 vibrations per second, using the common equally tempered scale, with A at 435 vibrations per second.

I also make use here of what I term my "borrowing system", clearly set forth in Patents No. 1,733,630 and No. 1,899,884, and dated, respectively, October 29, 1926, and February 28, 1933, and in which the vibrational frequencies used for the fundamentals of the equally tempered scale serve also for the partials associated with those fundamentals. I am aware that these are not theoretically true, but neither is the tempered scale itself theoretically true. They are, however, so close as to be thoroughly serviceable, and when it is remembered that the almost invariable outstanding characteristic of a partial properly used is that it shall not be heard as a pitch, but shall only affect the timbre resulting, it will be seen that any attempt to get better results by theoretical accuracy would be effort wasted. I have tried both the perfect intervals for partials and also the tempered scale intervals here used, and if there is any audible advantage in the former, used as partials, I failed to detect it.

When pitches are to be heard as such, as is commonly the case in chords, the difference between just intonation and tempered scale is such as to give to the former an emotional effect that is felt even by those who cannot recognize it as the result of a pitch difference. This wonderful effect of just intonation is keenly felt in the singing of some male quartets who have not learned to lean upon the piano, and in the playing of the great violinists.

Figures 1, 1A:
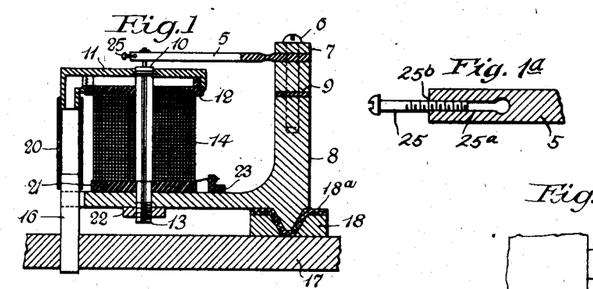
Figure 1 is a transverse section through one of the magnets and its coacting reed, showing the manner of mounting same.
Figure 1a is a view in side elevation of a portion of the reed shown in Figure 1.

Referring now to the drawings, Figure 1 illustrates an electro-magnet of one unit of the instrument, twelve such units being employed in the preferred embodiment, one for each note of the octave; that is, one unit will produce all the C-notes of the instrument, another all the C-# notes, another all the D-notes, and so on. A reed 5, here shown for purposes of illustration, is secured by a screw 6 between the upper members 7 of the casting 8, a shim 9 permitting vertical adjustment between said members. Screw 6 fits somewhat loosely in the members 7, thus affording a slight adjustment in a horizontal plane. A small valve 10, in this case of magnetic metal, is secured to the end of reed 5, and is positioned in the opening in the top 11 of the chamber over the magnet head 12. Valve 10 must be very accurately positioned in the opening mentioned, so that there shall be no unnecessary leakages of air. The air entering the chamber through the pipe 16 crowds the valve 10 and the reed 5 upward, giving the reed its outboard stroke. The loose mounting of screw 6 permits necessary adjustment for this purpose. Valve 10 is adjusted to vibrate as closely as possible to the magnetized core 13 without striking it and thus to create a flux-change in coil 14. The reed with its associated mechanism constitutes a "pick-up device" for one note. Air enters from chamber 15 through the pipes 16 which extend through the top wall 17 of said chamber, (see also Figure 4).

To render the pick-up device as non-sonorous as possible, since it is doing work that cuts down its vibration and will, of course, vibrate farther if this work is eliminated, one end of casting 8 is mounted in a groove formed of two pieces of wood, preferably maple, as seen at 18, Figure 1, glued to the top wall 17 of air chamber 15, and provided with felt 18a as shown. This secures the device against transverse misplacement, the grooved pieces 18 also shown in Figure 3 preventing longitudinal displacement while the washered screws 19 (Figure 2) hold all the parts firmly together and prevent the units coming out of the grooves in shipment or at other times.

As seen in Figure 1, a pipe 20 fits over the upper end of pipe 16 and connects it with the opening or air chamber in the magnet head 12, said pipe being of rubber or other suitable substance. Magnet head 12 may be threaded to receive the upper part 11 which forms the air chamber, this chamber being intentionally made very shallow to secure nearness to the magnet head on the part of the pick-up-stimulating valve without having the head project too far through its coil for efficiency. Because of this shallowness the air-port through magnet head 12 as well as that through the top wall 11, is made slightly wider than the diameter of the valve. The casting 8 may be of any suitable metal, and is secured against the lower magnet head 21 which has a slight shoulder above it, by a nut 22 as shown, or in any suitable way.

Figure 2:
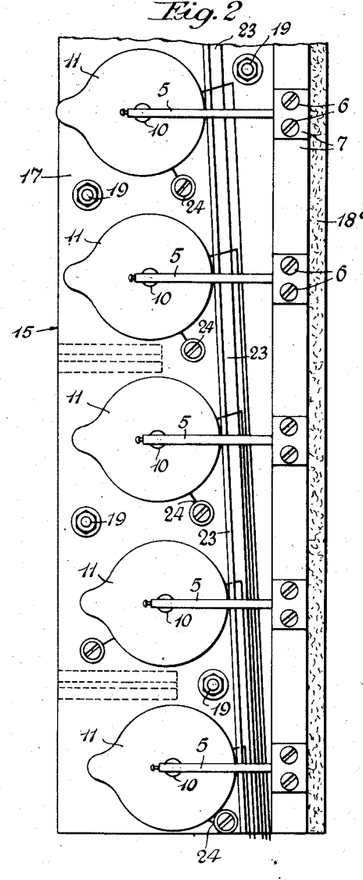
Figure 2 is a plan view of a portion of a magnet assembly embodying one of the twelve units herein employed.
Figure 3:
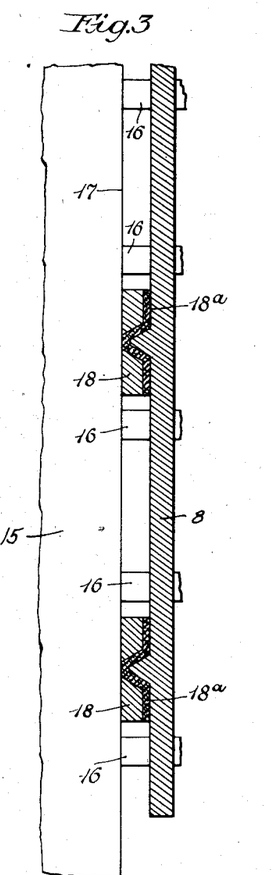
Figure 3 is a longitudinal section through the non-sonorous mounting for the magnets, parts being shown in full lines.

The lower end of pipe 16 opens into the main air chamber 15, its upper end and connecting pipe 20 opening into the chamber in the upper magnet head. A wiring strip 23 for the individual ends of the pick-up coils is provided, as seen in Figures 1 and 2, the other end of each coil being grounded on the unit frame as indicated at 24, the frame itself of course being properly grounded.

Figure 1B:
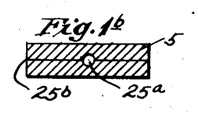
Figure 1b is an end view of the reed with the tuning screw removed.

In Figures 1, 1a and 1b the reed 5 is shown with the tuning screw 25 threaded into a longitudinal hole 25a in the split, free end 25b of said reed, thus permitting the hole to be tapped so that the screw will fit tightly and not loosen through vibration, the end of the reed, of course, springing open slightly when the tap is run into it. Other means of tuning may, of course, be employed, and at least one other has been illustrated herein and will later be mentioned.

Figure 4:
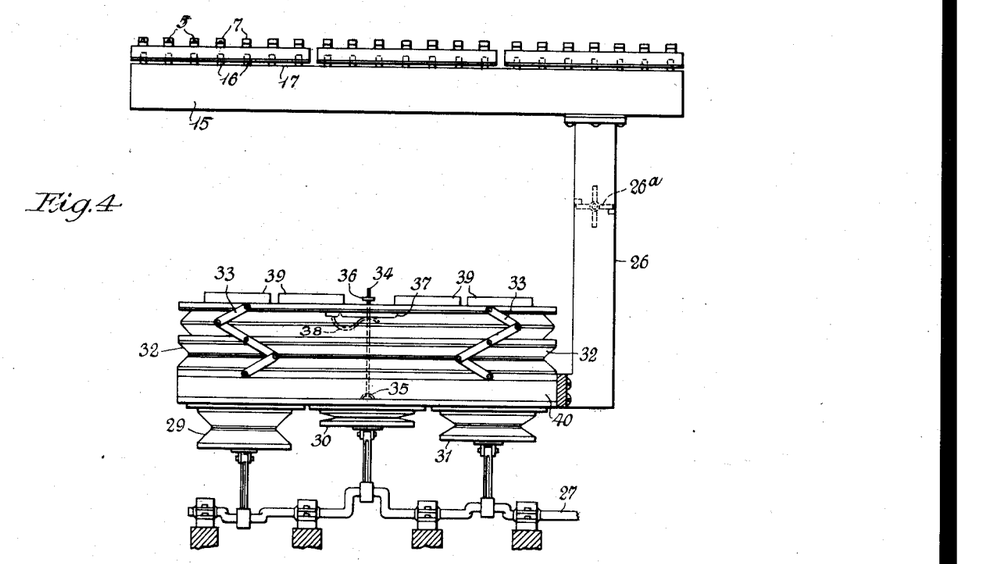
Figure 4 is a view in elevation with parts in section showing the means employed for continuously driving the reeds.

The wind mechanism employed for producing a sensibly constant pressure of air in chamber 15 despite the fact that all of the reeds or forks are vibrating all the time, is illustrated in Figure 4, it being constantly kept in mind that every pick-up magnet must be ready with its reed to respond instantly to any demand made upon it. The pipe 26 may be of wood and rectangular in section, or of any other suitable material and section, and it is provided with a valve 26a which may be closed until the pressure of the bellows rises sufficiently, and then opened. The circuit in which the motor is connected may include a double blade switch (see Figure 23a), contacts a, b and fuse c controlling the motor circuit while contacts d, e, f control the circuit of the battery or source of current 28 (see Figure 10) for the type of instrument using my permutation system (see Patent No. 1,977,598), the operative circuit of which has to have current. If a D. C. generator be used for this current, it would be very small and could run from the air-driven motor, but any other form of current supply which is inexpensive and properly efficient may be used. Where my permutation system is not used, as in the cheaper forms of instrument, only one switch would be employed.

The three bellows 29, 30 and 31 are positioned to create a steady pressure in the chamber of the large bellows 32. As illustrated, bellows 30 is shown compressed and about to open, bellows 29 has opened most of its distance, while bellows 31 has closed part way. This produces a steady, jerkless, uninterrupted feeding of the air. The lazy-tongs 33 prevent the undue collapse of bellows 32. A rod 34 threaded at one end, secured at its lower end by a hook 35 and at the threaded end by a nut 36, operates the flap safety valve 37 against the spring 38 and air pressure, when the bellows 32 reaches its desirable open limit against the pressure of the weights 39 or equivalent devices. The bellows 29, 30 and 31 are, of course, provided with the usual valves (not shown) to enable them properly to deliver air to bellows 32.

The ends of a few of the reeds 5 are seen projecting through the upper members 7 of casting 8 in the upper left-hand portion of Figure 4, and the pipes 16 are shown in dotted lines, the connecting tubes being omitted. The capacity of chamber 15 added to that of chamber 40, and the capacity of the connecting pipe 26 should be sufficient to take care of the draft of all the reed valves and need not be much greater.

By this construction all electrical impulses except those of the pick-up magnets are dispensed with, thus greatly simplifying the construction, and affording a dependable and steady vibration of all the reeds or forks.

Figure 5:
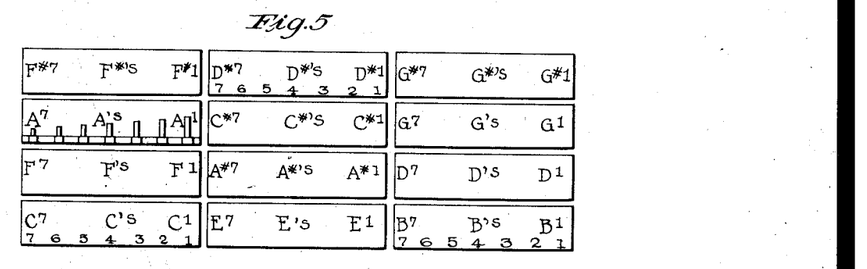
Figure 5 is a diagrammatic plan view of an advantageous arrangement of the twelve reed assemblies or units.

The units, all shown in Figure 5, may well be placed at the very top of the instrument and therefore above the plane of the keyboard (not shown), the bellows or pneumatics at the lower part or nearly so. The reeds are indicated in connection with the A-unit of this figure, the high-pitched reeds being placed to the left of the figure or to the player's right when seated at the instrument. It will be noted that in this arrangement the pick-up magnets are closer together between units in a longitudinal than in a transverse direction, and although they are probably not near enough to cause trouble by inductive coupling, the arrangement has been so planned that as far as possible dissonant notes will be widely separated, since a slight nuance of a harmonic pitch would not greatly matter. This particular arrangement may, of course, be varied as desired, and it may be necessary to shield some or all of the units. As shown in Figure 5, the lower note of one unit is next to the higher note of the next unit in a longitudinal direction, but this arrangement may be reversed if desired. The instrument as thus arranged is very compact, and the placement of the units at the top permits tuning or adjustment of any part under very easy conditions.

Figure 6:
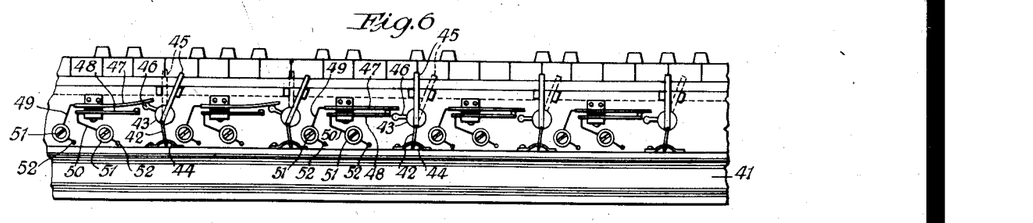
Figure 6 is a view in front elevation of a portion of a key-strip having means for instantaheously closing several partial lines at once, or only one as desired.
Figure 9:
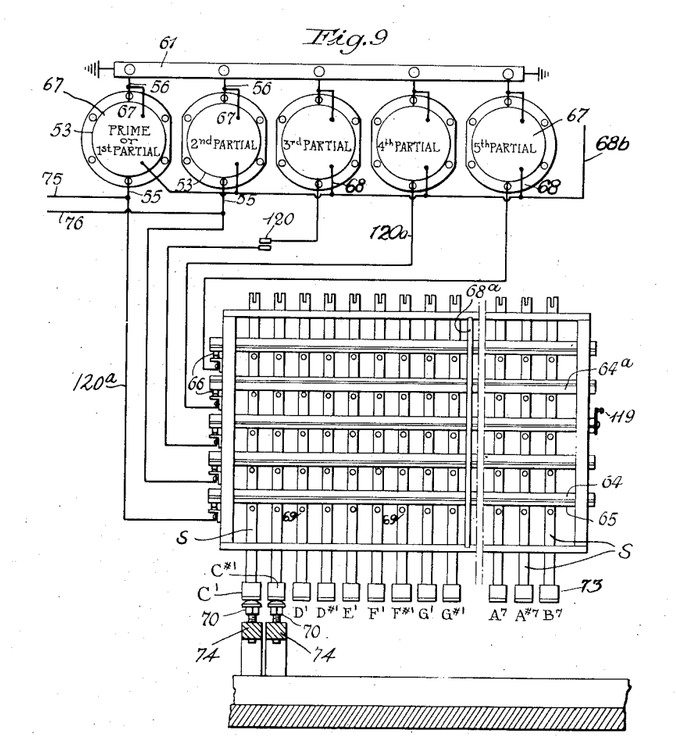
Figure 9 is a schematic view showing a plurality of partial-grading coils in circuit with the bus-bars of a sticker system and illustrating one form of means for cutting out selected ones of the partials.

Figure 6 illustrates means which may be employed in even the cheapest form of the instrument and which enable the performer, while playing, instantly to change the quality, by opening or closing any of the partial-selecting circuits such as 120 of Figure 9. In the more elaborate instruments having the permuting system and tappets of Figure 10, this switching system could be dispensed with or used in combination with such more elaborate mechanism. Suppose, for example, a performer about to play a selection desires to change from flute to reed quality and back again. The flute quality could, for example, be set up with the first, second and fourth partials by putting the movable coils illustrated in Figures 7 and 9 in correct position for this result. The performer then cuts out at the console switches under discussion, the second and fourth partials leaving the first in position, and thereafter sets the third and fifth partials so that with the first partial, it gives him the reed quality he desires. This done he can return to his flute quality, play such of his selection as he desires with that quality, then instantly cut out the third and fifth partials as he plays and at the same time or a little later, as pleases him, cut out the second and fourth partials. If he plays for a few measures after cutting in the third and fifth partials before he cuts out the second and fourth, he will have played three different qualities and may return at any point to any of them, or with a single movement of the draw-stop change all three qualities to three different ones, and all without interrupting the tempo of the selection he is playing.

In Figure 6 means are shown for setting up five partials, it being understood, of course, that as many as desired may be provided, this mechanism being essentially similar to that shown and described in my Patent No. 1,899,884, but differing slightly in detail. Mounted in tappet rail 41 is a series of flat metallic members 42, each with its top edge positioned in a groove in the cylindrical portion 43 of each tappet-rocker, the other end of each member 42 being elastically supported in and by a tongue spring 44 fastened at one end and bent to slide slightly at the other. By this arrangement the upper end of each metallic member 42 may be swung, although with considerable resistance, first to one and then to the other side of a vertical diameter of the cylindrical portion 43, thus ensuring stoppage of the switch at one or the other extreme of its movement only. The cylindrical portion of each tappet rocker carries radially projecting fingers 45 and a short arm 46, the latter adapted to raise member 47 from its coacting contact 48 and open the circuit of the associated partial which it controls, thus performing the function indicated as to one partial by the switch 120 of Figure 9. The wires 49, 50 pass from the binding posts 51 through the openings 52 into the interior of the case where they are suitably joined to the wires 120a of Figure 9.

Figure 7:
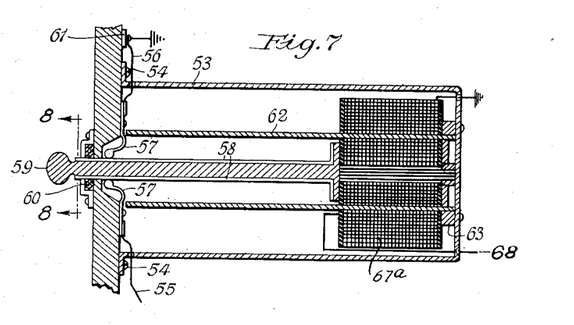
Figure 7 is a longitudinal section through one of the partial-grading induction coils.

It should be noted that three forms of cut-out for any partial are provided in this instrument, one at the rocker crank 119 of Figure 9, another at the draw-knob 59 of Figure 7, which is not only a cut-out where desired but an infinite grading system as well, the third being the tilting rockers of Figure 6 just described.

Figure 7 shows an induction coil with a movable primary and fixed core, so arranged that it may be placed at an infinite number of locations so as to give full strength to the secondary and every degree of lesser strength, and then to be drawn out so as to give no audible effect whatever. The device is so constructed that it may be conveniently operated by the player through the familiar draw-stop. Two leads have to be taken from each of these moving primaries, and the construction is such that a primary will stop anywhere and stay there until intentionally moved, and this without any detent, projections, holes or grooves preventing an infinite number of locations. The whole device is enclosed in a shield 53 fastened to the inside of the console by screws 54, wires 55, 56 passing through this shield and communicating with the bent, spring contacts and grippers 57. These members 57 are so formed that they grip the flat contact-strips 58 on the upper and lower surfaces of the non-conducting, rectangularly-sectioned rod 59 so as to take off and supply current from and to the primary coil. The upper of the contact strips 58 is graduated so as to indicate by the position of its graduations against the non-conducting cover of the felt member 60 just how far it is drawn out. The graduations are preferably not sufficiently large or deep to prevent the smooth movement of the stop, or its free positioning at any point, the bearing surfaces of the spring members 57 being preferably made so as not to drop into any small indentations, and if desirable, all marks may be to one side of its path. One side of each of the primaries is grounded on a bus-bar 61 shown also in Figure 9, and the other primary terminals 55 go as shown in said figure.

The draw-stops 59 may be in any position which is convenient for ready operation. The secondary coil may be secured to the shield, as shown, and the tube 62 of any suitable material is secured in the ring 63 at its rear end and fastened to the console at its front end, or in any other suitable way, to the end that it may serve as a smooth and sure guide for moving primary coil. I am aware that step-by-step potentiometers might be used, but these do not give an infinite number of gradations and are relatively very coarse in their adjustments.

Figure 8:
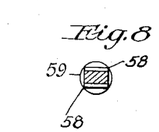
Figure 8 is a transverse section on the line 8—8 of Figure 7.

Figure 8 is a detail of the draw-knob 59a, illustrating its rectangular section, and the positioning of the conducting upper and lower strips 58 secured thereto.

Figure 9 illustrates, from the rear, key stickers S. It is to be understood that while I have shown here but five partials, I may, and ordinarily would, use several more, and I do not limit myself to any number. The five shown are sufficient for illustrating the purpose of the invention, and needless complication of the drawings is avoided. It will be noted, therefore, that there are five rods or rollers 64, which may conveniently be long dowels where they are to be turned at times as shown, each rod being provided with a portion of a tube 65 of metal, preferably silver or silvered, fastened to it throughout its active length, said tube serving as a continuous conductor and also as a stiffener. It is also to be noted that where the crank 119 or equivalent mechanism is not to be used to cut out and in partials by the turning of the rods 64 (and the rockers of Figure 6 serve the same purpose), these rotatable rods may be replaced by fixed bus-bar strips, simplifying and cheapening the instrument. A brush 66 takes off the current from each rod 64 when it is turned with its contact strip 65 downward, but when it is turned with said strip upward, as shown in connection with the second rod 64a from the top, everything is dead as to that rod. The back ends of the casings of the coils of Figure 7 are shown at 67, and each casing is marked with the partial it serves, the bus-bar 61 being that illustrated in said figure already referred to as the common ground. The wire 68 from the secondaries of these coils runs to the common line 68b, Fig. 9b, thence to the primary coil of transformer T. Across the secondary coil of transformer T is connected in series the condenser 88a and the resistor 89a; the conventional key-click filter arrangement. At 91a is shown an eccentric, whose purpose is to open and close a switch 99' at a rate suitable for a tremolo, i. e. eight times per second. The resistor 92a serves to shunt the contacts of switch 99a. The variable resistor 94a controls the degree of variation, across the output lines, through the condenser 93a. The pedal 88 operates a potentiometer 89 through the member 90 and serves as an expression control for the instrument. The wire 90a, passes the output voltage to an amplifier A.

Figures 9A, 13, 14, 15, 16, 17, 18, 19, 20, 23A, 24, 25:
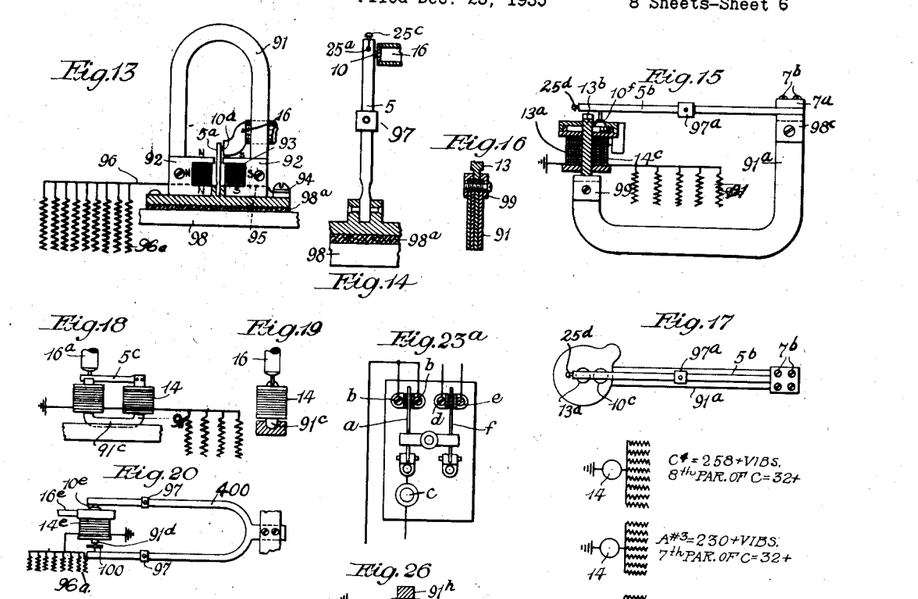

As shown, the rods or rollers 64 pass through partitions 68a placed at convenient intervals and serving to support them. The whole action forms a neat little frame easily removable and conveniently wired, from the front, as seen at the left of Figure 9a which shows the wires coming from the "generators" or pick-up magnets 14, clearly indicated as to their vibrational numbers and partial relations, and soldered to the appropriate wires 69 of the contact action. It will be noted that three additional partials, not wired, are illustrated in order to make it plain that more than five partials are contemplated. It will also be noted that five resistors are indicated for each pick-up magnet used in the five-partial showing, whereas six, seven and eight resistors respectively are shown in the remaining three partials, since a single manual instrument is illustrated for simplicity's sake. These resistors or impedances may be multiplied to any number where "borrowing" is further made use of. If the same generators were used for a two-manual instrument, there would be at least twice as many of these impedances or resistors. I have shown some strong pick-up devices which are especially intended for multiple demands being made upon them, as will appear later.

The stickers S of Figures 9 and 9a are held down upon their associated capstan-screws 70 by springs 71, Fig. 9, in slots in the upper ends of the stickers, the slots serving also to prevent rotation of the stickers and binding on the wires 69. The contact wires 69 pass through houes 69 in the stickers as shown in Figure 9, and the holes are counterbored a little conically, or freed from each side, to make the operation more flexible. The lower end of the sticker carries an enlarged portion 69b for a felt or buckskin washer 73 to bear on the capstan-screw 70 adjustable in the rear end of each key 74.

Figure 10:
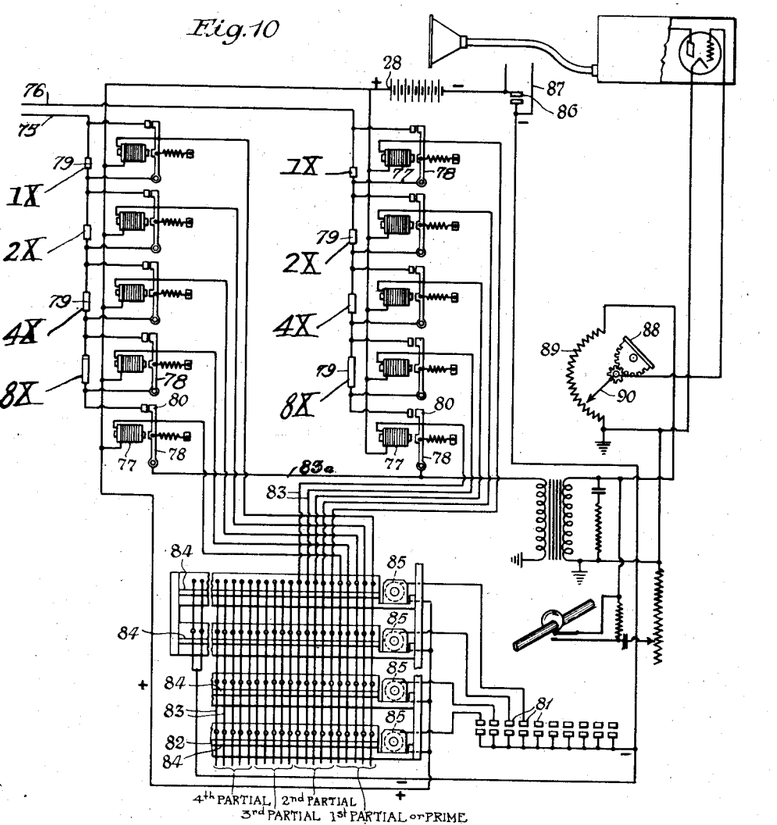
Figure 10 is a diagram of a slightly different form of partial mixing circuit.
Figure 12:
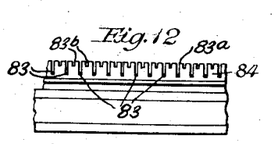
Figure 12 is a view in elevation of a portion of one of the set-up combs of the form of my invention shown in Figure 10.

The permuting system illustrated in Figure 10 is that of my Patent No. 1,977,598, as applied to the present type of electronic instrument in which it has been materially cheapened and simplified. The enlarging and expression connections, together with ten co-acting pairs of tappets 81, only the four necessary to illustrate the principle being there shown as wired, are also indicated. In this figure, magnets 77 co-act with the rocking members 78 to close the lines of their associated resistance 79. The rocking members 78 in this instance carry only a single pair of contacts 80, their function being to open and close only one circuit, analogous to the tilting finger-operated rockers of Figure 6. Operation of the tappets 81 causes the bridging bar 82 to rise and pick up all the wires 83 which are nested in the lower slots of their associated comb 84 (see Figure 12). The rear end of each wire 83 is connected to a magnet 77. The circuit of battery 28 is opened and closed by switch 86, which is connected by wire 87 to the switch shown in Figure 23a. This battery may be in the form of a current generator serving to supply the operative system of which the tappets 81, magnets 85, and set-up system coils form a part. If a sufficient and sufficiently cheap supply of operating current can be furnished without a D. C. generator, it will conform to one of the underlying principles of this case, i. e., to keep all but necessary fields of force as far away as possible. Any means of generating current may, however, be used.

The pedal 88 operates a potentiometer 89 through the member 90, said potentiometer being connected in a conventional amplifier circuit, so as to enable the loudness of the sound to be controlled.

Figure 13 shows a pick-up unit in which 91 indicates a permanent magnet with pole pieces 92 between which is inserted a hollow coil 93 through which projects a reed 5a with its valve 10a attached and operated by wind or suction acting through a pipe 16a. A binding-post 94 is provided for the pick-up lead 95 which is shown grounded, the other lead 96 being shown with many resistors in its lines to indicate that the pick-up form of magnet shown is capable of power enough to stand a multiplicity of uses simultaneously as, for example, a two-manual service. A strip 98a which may be of felt, mounted upon a member 98 of any suitable material, is provided to make reed 5a as non-sonorous as possible, thus necessitating little sound-proofing and rendering the efficiency greater, as formerly mentioned herein in a similar connection. The left-hand pole-piece 92 is strongly north polarity and the right-hand one is strongly south polarity, and the reed passes through the center of the coil, which is an intense field, so that when it swings to the right it tends to make the lines flow from the top of the south pole to the bottom of the north pole, and when it swings the other way, the lines go from the top of the north pole to the bottom of the south pole, thus setting up a flux in the coil 93. This is considered one of the best of the strong pick-ups, intended for heavy duty. It will be noted that the resistors, 96a of this figure, are shown longer than those of Figure 21, which are themselves longer than those of Figure 22, and that they sometimes vary even in number, for in Figure 15 only five are shown as against nine in Figure 13. These variations are intended to show that a generator of one pitch may be subject to more demands upon it than another generator of another pitch, each demand rendering desirable a separate resistor. The differences in length of resistors are intended to indicate differences in the amount of resistance. These may vary as between notes from three causes. Permanently magnetized cores are apt to vary rather widely in their degree of magnetism unless rather expensive care is taken in their manufacture and magnetization. It is desirable, therefore, to test each core, and if it be above the efficiency of the poorest cores to be used, to compensate for this abnormal strength by making the resistors of higher resistance for that pick-up, though all of them of equal value for that note, for it is to be borne in mind that it is very important to have these pick-up cores as near their co-acting parts as the necessary movement without striking will permit, for the sake of efficiency and also for the purpose of cheapening production. By bringing groups of pick-up cores to a line, even though that line be at a slight angle to a line across their co-acting moving parts to allow for the greater amplitude of movement where the pitch is low than where it is high, and then compensating for varying magnet strength at the resistors, assembly and voicing is accelerated where the type of pick-up makes this possible. The second cause is that the higher notes—the generators of higher frequencies—naturally produce greater intensities than the low note generators, and this, too, may be compensated for by an increasing resistance between the pitches generated, as those pitches rise; but the higher notes are also more frequently commanded than the lower notes, so that this makes a third factor to be considered, by permuting into the tendency of higher notes to be more intense, the further tendency that a larger number of divisions of the output of each generator will commonly be required where the pitch is high than where it is low. All these factors taken together dictate, for best results, resistances alike in value for periodicity, but varying in value for different periodicities; resistors in greater number for high than for low periodicities; and resistors planned to compensate for magnetic inefficiency of cores. These factors I allow for as described.

Figure 14 is a detail of the reed of Figure 13, showing one form of tuning device, in which the opening 25a is drilled endwise into the reed, and after the drilling the end is sawed down to the transverse hole. The longitudinal hole is tapped and the spreading of the split portion springs away from the tap, so that when the screw 25c is turned in, it will hug it tightly so that it will not vibrate free. This form of tuning screw is used in several of the figures and will not need further description in any of them.

Figure 15 shows another form of a rather efficient pick-up construction. Here the reed 5b has a sliding rider 97 secured to it by a screw 97a, and constituting a form of combined tuning and partial-eradicating device. The free end of the reed has a tuning screw 25d, the same as screw 25c. A permanent magnet 91a is again employed, which may be cast, for they are now casting permanent magnets which have a coercive force of more than twice cobalt steel, as well as other strong recommendations as to permanency and the like, one of these alloys, known as "MK steel" being most useful in such cases. Reed 5b is here secured beneath a block 7a by screws 7b or otherwise, to the right-hand end of the magnetized member, and there may be, as shown, a soft steel or iron seat 98c screwed to the magnetized member. On the other end of said member a similar piece 99 carrying the soft iron or steel core 13a of the magnet, serves to magnetize said core strongly, so that with the reed extending from the other pole of the permanent magnet to and almost in contact with the magnetized core, a very strong field is developed, the movement of the reed in this field generating a strong flux in the winding of the pick-up magnet 14c. The reed 5b is propelled, in the familiar way, through an air valve 10c, which in this case need not even be metallic, by the air pressure supplied through the pipe 16 as before described. It will be noted that the core 13a of Figures 15, 16 and 17 may, where desirable, be slitted down a little at its upper end as at 13b, to permit the reed to swing its stroke without hitting and at the same time without ever leaving the head for any considerable distance, thus preventing striking of the reed against any of the associated parts.

Figure 16 shows how the permanent magnet 91a may be laminated for greater strength.

Figure 17 is a plan view of the device of Figure 15 and need not be further described.

Figures 18 and 19 are two views of another type of pick-up, in which two pick-up coils are used about a permanent magnet 91c, the reed 5c extending from one pole nearly to the other pole, the air valve being over the end of the core, and operating downward by the pressure of the air through the pipe 16a. The two coils are shown connected together in series.

Figure 20 illustrates a tuning fork 400 used as a pick-up, employing a permanently magnetized core 91d extending through the coil 14e, with a valve 10e of magnetic metal bearing near the head of the magnet, and a member 100 of magnetizable metal attached to the other prong of the fork and vibrating near the other end of the core. A double action is thus secured, both prongs leaving the core ends at one time and both approaching them at another time, thereby creating twice the air-gap at one time and but half the normal air-gap (where one pole only is used) at the other stroke. The wind chamber is similar to that of Figure 1, and air is supplied through the pipe 16e as in that figure.

Figure 21:
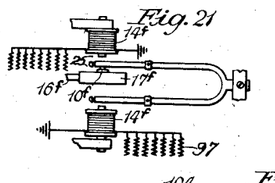

Figure 21 shows a variant of the tuning fork pick-up of Figure 20, and has two coils 14f both directly affected by the vibration of the fork legs to and from their respective heads. A separate and self-contained wind chamber 17f, air supply 16f and valve 10f are here provided. One side of each coil 14f is shown grounded, and the other side of each is shown with a multiplicity of impedances, as might be the case if one coil were for one manual, say, and the other for a second manual, or other added duty.

Figure 22:
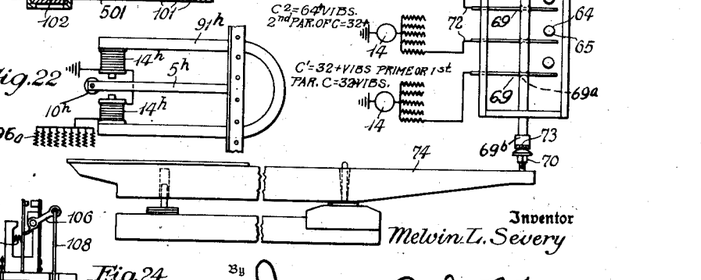

Figures 22 and 26 show two views of another type of strong pick-up. Here a permanent magnet 91h has coils 14h, one on either leg, thus magnetizing their soft cores. A reed 5h is secured at its immovable end to the member holding the permanent magnet, by non-magnetic support, so as to vibrate at its outer end between the north and south poles of the cores of the coils, thus moving in a very strong field and setting up fluxes therein. The valve 10h in the actuating pipe 16 is shown best in Figure 26.

Figure 23 shows a type of pick-up where a reed in a chamber, fed by air through the pipe 16i, and with bleed holes 101 sufficient to prevent back pressure against the vibrating reed, is used to set up resistance variations in the microphone 102 directly below it, caused by the vibrations of the air under the impulse of the reed. Here it is advantageous to have the chamber capacity resonant to the pitch of the reed whose different positions are shown by the full line 500 and the dotted line 501. A battery or source of current 103 is shown in series with a primary coil 104 that being the circuit in which the flux occurs. A secondary coil 105 and associated key 74 and contact details for the secondary part of the device are also illustrated. The operation is self-evident, and it is shown chiefly to show the superior simplicity of my other methods. As the pick-up impulses must be instantly available for reasons elaborated at the beginning of this specification, the direct current must be traversing all the microphones constantly during playing, and this invites heating, and attendant packing and unreliability. Then, too, the current will be quite appreciable, and each note will have to have its own independent primary and secondary coil, which is expensive, and these, with other details not mentioned, make it the least attractive of all the forms shown, and clearly emphasize the great advantage of a wind-driven reed or fork pick-up.

Figures 24 and 25 show an early type of key-actuated partial-mixing switch, such as illustrated and described in my Patent No. 1,733,630. Here the switch consists of three coacting pairs of contacts 1, 2, 3, 3a, 4, 4a, the contacts 1, 3 and 4 being spring fingers which tend to move into engagement with their respective co-acting members of the pairs. They are, however, normally held out of engagement by means of a swinging arm 106 which is acted upon by a tension spring 107. Connected to one end of arm 106 is a rod 108 having at its free end a foot 109. The instrument key 74 has a capstan screw 70 mounted upon one end thereof and disposed to abut against foot 109 and raise the rod 108, thereby moving arm 106 to withdraw the end thereof and permit the contacts 1, 3 and 4 to engage the co-acting members of their respective pairs. Upon operating a key the contacts in the key switch close the circuits leading to the fingers associated with the fundamental and to those associated with its higher partials.

In a musical instrument synthetically mixing partials for the production of various timbres, it is essential that the operation of a single key of the manual intended to elicit a compound tone shall actuate a plurality of differently tuned instrumentalities, and it is most desirable that this should be accomplished without unduly laboring the key action. In my larger instruments, where a relatively large number of partials is used, and a considerable amount of direct current has to be handled, I have at times found it expedient to use the keys merely for the actuation of an electrical operative system performing the function of the keys of the smaller type instrument without prejudicial loading. This system I have fully set forth in my Patent No. 1,899,884. Where, however, but few partials are used, or where the current to be handled is very small in amount, a decided saving in expense and complexity may be attained by causing the pressure of each key directly to operate the partial-mixing instrumentalities without the interposition of any relays. This method I have shown in my Patent No. 1,733,630, where in Figure 1 I also show the general plan of partial selection as well as the method of grading the relative strengths of all of the partials used in the various timbres. In the present application I use this same principle of direct key-operated partial mixing; and the more elaborate partial layout and anti-robbing system of my Patent No. 1,899,884 translated here into alternating current terms.

Figure 11:
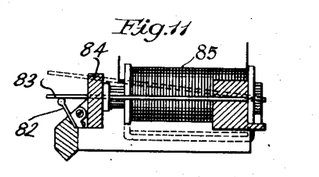
Figure 11 is a view partly in section and partly in elevation of the rocker mechanism employed in the circuit shown in Figure 10.

In this specification I have used the term "infinite" as connoting two interpretations, namely: 1. Theoretical and mathematical infinity, and 2, as a number "impossible to exhaust". In this invention, the sliding coils shown at Figure 7 afford a means for producing a theoretically and mathematically infinite number of tone qualities as contemplated by the first definition, while the permuting system shown in Figures 10 to 12, inclusive, illustrates means I have devised for producing a number of tonal qualities "impossible to exhaust" in thousands of lifetimes, as contemplated by the second definition. A few words of explanation will make this plain. There are shown herein four partials above the prime and each of these partials is shown here as having sixteen possible gradations of loudness, making 4×16 or 64 permuting factors. One factor produces but one possible result; two factors can produce three results; three factors seven results; four, fifteen, and so on doubling and adding one for the possible combinations, each time a new factor is added. By this method it is found that the sixty-four factors possible with the permuting device as here shown at Figure 10 with only four partials above the fundamental, give a number of possible tonal qualities requiring twenty figures to express it, being of the order of quintillions, using the French system of numeration common in this country, and representing more seconds than there would be in a hundred thousand years. From this it will be seen that "impossible to exhaust" as here used, and theoretical infinity, may both be taken as infinite to all human intents and purposes, in this present connection.

Figure 27:
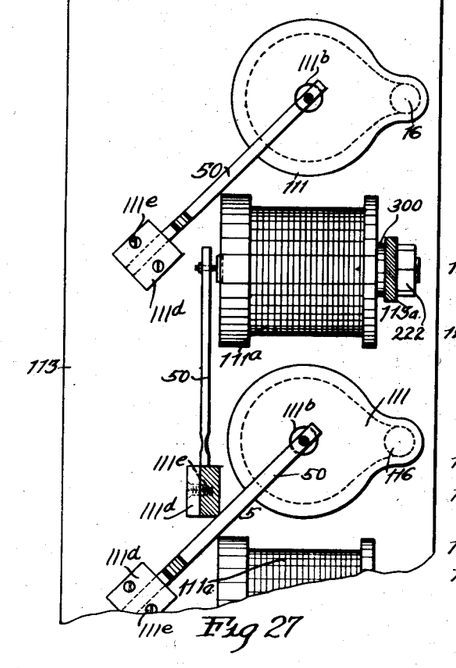

Figure 27 shows a portion of a single-letter unit, as, for example, one devoted to the C's of the instrument, with its pick-up coils arranged to prevent inductive coupling. 111—111 represent two coils in plan view, while 111a—111a, show coils turned at 90 degrees thereto, to obviate their coupling. 50—50 are the reeds or equivalent vibrating means, and to them are attached wind-driven plungers or valves 111b—111b. The reeds are secured firmly between clamps 111c and 111d, by screws 111e as shown.

Figure 28:
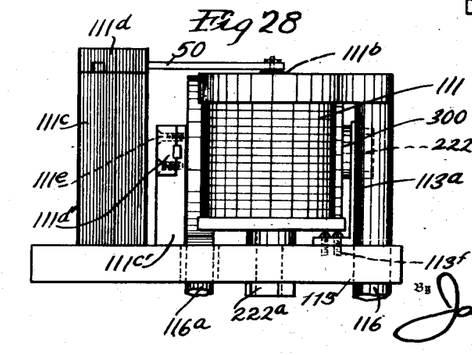

In Figure 28, a wind pipe 116, for the upright magnet, and another wind pipe 116a for the magnet placed at 90 degrees from it, pass through the base member 113, to which is secured by screws 113f, or otherwise, the upright angle 113a, serving to support the transversely disposed magnet. The core 300 of this magnet passes through the upper end of 113a.

Figure 29:
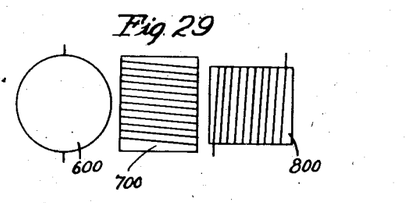

Figure 29 is a schematic view showing a placement of three pick-up coils which will entirely eliminate inductive coupling between any two neighboring coils. It will be seen that coil 600 is rotated 90 degrees from coil 700, and it is to be understood that the mid-point in the length of coil 600 coincides with the mid-point in the length of coil 700, while the axial center of coil 800 coincides with this last mentioned mid-point on the other side of coil 600. Such a disposition is most effective in eliminating inductive coupling, and when it is realized that I preferably put notes of the same letter on my units it will be realized that any coupling which might take place were this care not exercised, would still only enrich the tones rather than make dissonances. The care, however, is worth while in all but the cheaper types of my invention, for the reason that keeping the tones fundamental in quality before mixing for timbre makes it possible to get any timbre desired.

Figure 30:
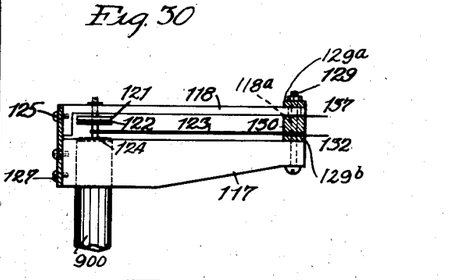

Figure 30 shows a wind-operated type of pick-up working as shown in full line by suction through the pipe 900, causing the plunger 124 to vibrate back and forth in the end thereof, thus vibrating the reed or equivalent resilient member to which it is attached with it, the said reed determining the periodicity of the vibration. A member 122, which may well be circular in shape, is also carried by the reed and opposed to it at a relatively small distance is a similarly shaped member 121, fastened rigidly but adjustably in the member 118, secured at both its ends as shown. Screws 126, passing through an insulating plate, 127, hold this member 118 to the pipe-holding part 117, at the rightward end of both. A bolt 129 holds these two parts together at their opposite ends. The cross-hatched portions 129a and 129b at this end indicate insulating washers so placed with reference to the tape-leads 132, 137, that 132 shall be in electrical connection with the reed 123, and 137 in electrical connection with the supporting member 118 and, therefore, with the disk-like member 121. A free hole through 118a in member 118 shown in dotted lines insulates 118 from the bolt 129. When air is sucked out of the pipe 900, the reed, shown as rather low pitch, is set in vibration, and its attached member 122 alternately approaches and recedes from its co-acting member 121. When current is applied to 137, it charges 121 through 118 so that the relation of 122 is that of the two opposite poles of a condenser separated by a dielectric which in this case would be air. It, therefore, happens that as the wind-driven reed varies the distance between these two poles it varies the thickness of the dielectric and so sets up alternating electrical pulsations of sinusoidal form or sufficiently near thereto to serve splendidly for musical purposes, and these pulsations are taken off the reed at 132.

Figure 31:
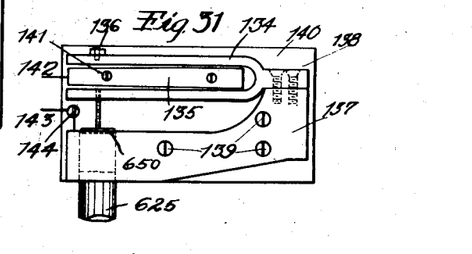

Figure 31 shows a fork 134, between the prongs of which and in close proximity thereto, but not in contact therewith even during the movement of the prongs, is a conducting member 135, to which is attached a wire 142. This member 135 is screwed by screws 141 to a non-conducting base 140 in a way to press it firmly against intervening porcelain blocks 145, shown cross-hatched in Figure 32. The fork is held by screws 138 serving to hold its stationary end rigidly to the metal member 137, which carries the wind-pipe 625. From this member a wire passes to a binding screw 144 to form the lead 143. Another lead 142 is attached to the stationary member 135. A plunger-valve 10 is fastened to the lower prong of the fork and a counterbalancing weight 136 is fastened opposite thereto upon the upper prong. Screws 138, 138, fasten 137 to the non-conducting base plate 140, and the fork 134 is in metallic contact with this member 137. When, therefore, wind is forced through the pipe 625 and against the valve 650 fastened to the lower prong of the fork, the fork is set in vibration and its prongs alternately approach and recede from the conducting member 135 placed between them. This member being charged by current through the wire 142 sets up an opposite polarity in the prongs of the fork across the dielectric occupying the narrow spaces between them and the member 135. It follows, therefore, that as the fork prongs approach and recede from 135, the thickness of this dielectric is varied and an alternating current generated which has a pitch and a wave-form determined by the fork, and this current may be taken off at 143, the principle of action being like that of the members 121 and 122 of Figure 30.

Figure 32:
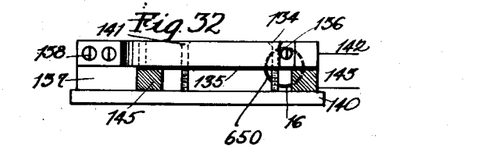

Figure 32 is a view of Figure 31 rotated 90 degrees, and turned end for end as well, to permit of better showing. 134 is the fork fastened by screws 138 to the metallic member 137. 135 shows the lower edge of the charged member between the prongs of the fork, it being held upon the porcelain blocks 145 by the long screws 141.

Figures 34, 35, 36:
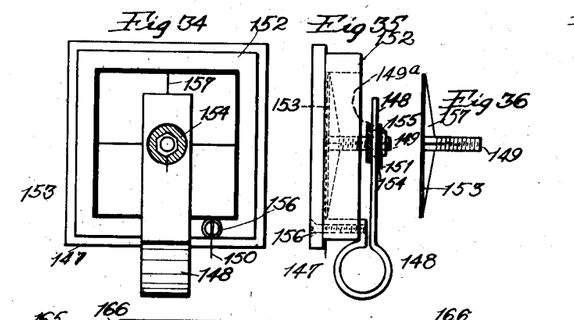

Figure 33 shows an organ pipe in section with an inserted pick-up device, like that shown in detail at Figures 34, 35 and 36 to be now described.

In Figures 34, 35 and 36, 153 is the ribbed plunger fastened to the spring member 148 which may be well tuned to something like the pitch of the pipe though it need not be in perfect resonance therewith. The member 153 is held at its end 149 in the end of the spring 148, between washers of insulating material 154, the rightmost washer being threaded on the stem 149, the nut 155 serving to hold the spring firmly in place on the stem 149. The other end of spring 148 is held to the member 152 by the screw 156, so that while it is in electrical contact with 152 it is insulated from 149 by the free hole 149a near its upper end which is free enough to permit of all needful adjustment. The plunger 153 is provided with ribs 157 to prevent it from flexing as would a diaphragm, and so producing a complex wave-form. The expanded portion 147 of the pick-up device enables it to be readily pressed into the pipe 146 of Figure 33 and there secured air-tight. A lead 151 is attached to the plunger at 149, and another lead 150 is attached to the part 152 of the member 147, at 156, thus providing for current supply and take-off. The action is all but self-evident in the light of what has been said regarding Figures 30, 31 and 32. The movement of 153 to and from the flat opposed surface almost in contact with it and of opposite polarity to it, due to the action of the power supply 158 when the key 159 is pressed, causes the generation of an alternating electrical current of a sine-wave characteristic having the same periodicity as the pipe 146.

Figures 37, 38, 42:
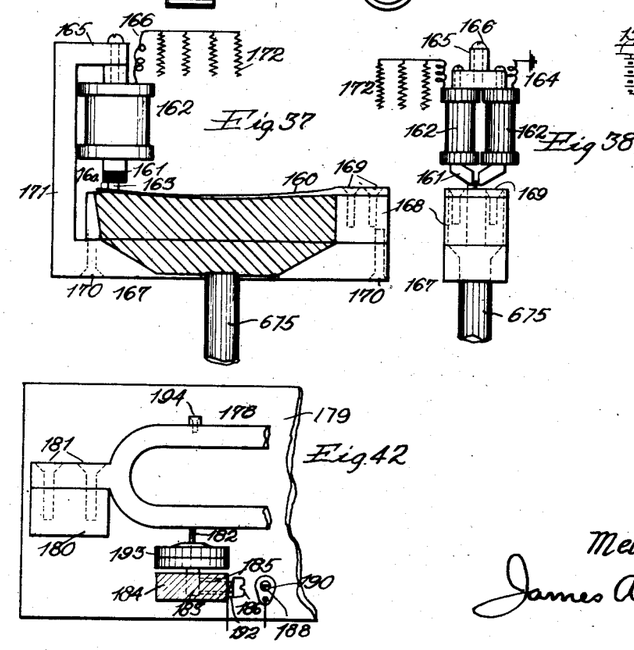

Figures 37 and 38 are, side and end views, respectively, of a wind-actuated reed 160 carrying a small upstanding portion 163 of magnetizable metal, vibrating between the poles 161 of the pick-up magnets 162. These magnets 162 may be flattened as shown, as to their permanently magnetized cores, for the purpose of getting these cores nearer together. The part 168 forming the upper portion of the chamber beneath the reed 160 is firmly screwed to the lower member 167 carrying the wind-pipe 16 by screws 170, so as to make an air-tight jacket. The reed is fastened to the member 168 by screws 169. The air chamber formed by these two pieces 167 and 168 is preferably of a size and shape to favor the vibration of the reed, but perfect resonance is not necessary. The permanently magnetized cores 161 are secured to the angular portion 165 of the upstanding bracket 171 by screws 166. Leads 164, 164 are provided for the alternating current generated, one of which is shown as going to ground and the other as provided with resistors, which may be of any desired number, and which are for the purpose of so dividing the load of the pick-up magnets that there shall not be an overdraft upon any of them. The action is as follows: When air is forced under pressure through the pipe 675, the reed 160 vibrates and carries the upstanding portion 163 of magnetic metal up and down between the permanently magnetized poles 161, 161, of the pick-up device, thus generating an alternating current in the coils of the pick-up magnets.

Figure 39:
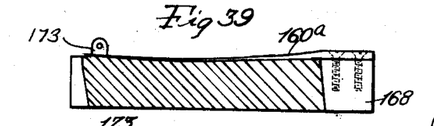
Figure 40:
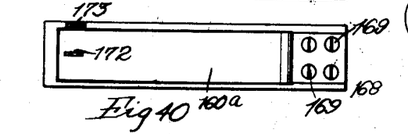
Figure 41:
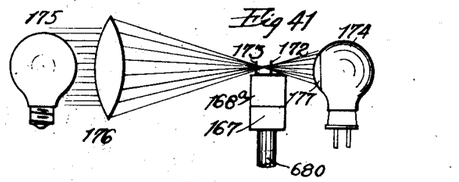

Figures 39, 40 and 41 show a similar reed construction used in connection with a source of radiant energy and a cell sensitive thereto. Figure 39 shows the upper part 168 of the reed unit of Figure 37 just described, but omits the lower part 167 thereof which carries the wind-pipe 680, this lower part being deemed unnecessary to show again, though it would, of course, be used. The reed 160a carries at its left-hand end an upstanding portion 172 pierced by a hole. Figure 40, which is a plan view of the sectional Figure 39, shows this same reed-carried upstanding portion 172 and a stationary co-acting portion on air chamber section 168a similarly pierced at 173, as shown more clearly in Figure 40. 175 is a source of radiant energy, in this case light, and 174 is a cell sensitive to radiant energy. These cells are sometimes electrical generators under a varying stimulus and sometimes they merely vary their resistance to an electrical current under such stimulus, and either of these types may, of course, be used, or any other means unto the same end. 176 is a lens for converging the light from 175 so that it shall pass through the hole in reed-carried 172 after passing through the similar hole in the stationary member 173 finally reaching the "window" 177 of the cell 174. The action is as follows: The reed 160 is set in motion by air under pressure from the pipe 16, and as it reciprocates at a self-determined pitch, it carries the upstanding portion 172 up and down, causing said portion, pierced as it is, to act as a shutter to the light or other radiant energy passing through the hole 173, from the source 175, and so rhythmically varying the light falling upon the "window" 177 of the cell 174, which cell under these conditions either allows varying amounts of electric current to pass through it, or acts as a generator of varying amounts of electric current. In each case, the periodicity of the said variations is controlled by the pitch of the reed, and the form of the wave generated is determined by the reed and the shapes of the coacting holes in 172 and 173.

In Figure 42, 178 is a fork, the prongs of which are shown broken away, but which is to be understood to be provided with machanical means for continuous actuation, which means may be that shown in Figures 31 and 32 hereof, or any other suitable means. 179 is a base member also broken away, from which rises a member 180 to which the end of the fork is secured in any suitable way, as, for example, by the screws 181, 181. Upon one prong of the fork, at 182, is fastened a granular or other microphone button, the lower member 183 whereof is secured to a projection 184 rising from the base 179. A threaded metallic sleeve 185 is secured in 184, and into this is threaded the retaining screw 186, the left end of which bears upon the part 183 projecting downwardly from the microphone member 183. A washer 192 soldered to the sleeve 185 and to which is attached a wire 187 serving as a lead serves to complete an electrical connection with 183 and through its co-acting member 193, with the fork and the base in electrical connection therewith. The other pole of the circuit is from the base at the screw 190 securing the washer for the lead 188 to the base 179. 194 is a counterbalancing rider to compensate for the weight of the microphone part attached to the fork at 182. Adjustment is made by loosening 186 and moving the stem 185 up or down, as may be needed, and then tightening the screw to hold it in the adjusted position. The vibrations of the fork cause the granules of carbon to vary their resistance as a whole in accord with the movements of the fork, and this produces a pulsating current of a waveform most admirably suited to the needs of an electronic musical instrument, which may be used in any suitable way.

It is to be understood that while this instrument may have the short keyboard of the organ, it is here considered as having seven octaves of keys, and as inclining more to the piano than to the organ type of keyboard. There are many more pianists than organists, and some of the more advanced organ builders are strongly advocating a keyboard, and applying it to some of the manuals of their organs, upon which the note wanted can be gotten just by playing its associated key. It is to be understood, however, that I do not confine myself to any particular form of coupling, or to any other characteristic of the piano or organ, since it is quite within the province of my invention to use or omit a pedal bass and/or any of the various means the organ adopts for musical rendition.

Figure 9B:
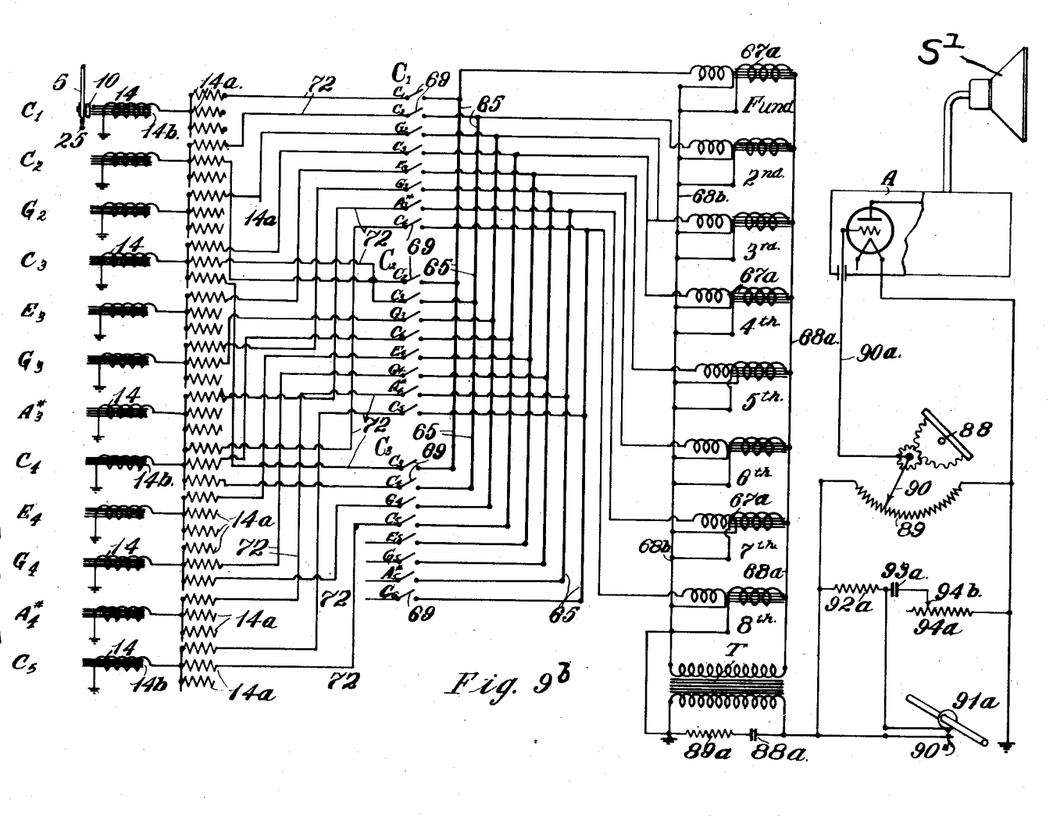
Figure 9b is a diagram of one form of circuit employed for amplifying and translating the generated voltages into audible sound waves; and selecting and mixing partials.

In Figure 9b which is a diagrammatic illustration of an organ employing continuously air driven reeds of the type shown in Figures 1 and 2, it will be understood that a complete organ would probably have 96 of said reeds.

Referring more particularly to Figure 9b, at the upper left hand corner thereof is shown a reed 5, and an armature 10, which provides the variations in magnetic flux as the reed is vibrated. A coil 14 is wound over a permanently magnetized core 14b, whereby magnetic variations will be changed into electrical variations. Multiple resistors 14a are provided in each key switch lead 72, so that the volume of sound produced at the loud speaker S1 is proportional to the number of keys simultaneously depressed. The wires 72 conduct the current from the multiple resistors 14a, to the key switch fingers 69 as will be appreciated on reference to Figures 9 and 9a. Common to all the key switches, are the partial bus-bar 65. Each of said bus-bars is connected to the movable primary of an individual variable transformer shown in detail Figures 7 and 8. The variable transformers representing the 5th and 7th partials are shown partially engaged for the sake of illustration. The variable transformers 67a are connected in parallel with the transformer T, by the common conductors 68a and 68b. Across the secondary of said transformer is connected a resistor 89a and a capacitor 88a in a conventional circuit as is common in the art for avoiding key click. The resistor 92a is periodically shunted by the contacts 90a through the rotary motion of the eccentric 91a, and thereby controls the tremolo circuit which comprises the capacitor 93a and the variable resistor 94a, which is shunted across the secondary of the transformer T. The degree of tremolo thus depends upon the position of the fingers 94b along the resistor 84a. The expression control pedal 88 serves to vary the setting of the finger 90 along the resistor 89, and thus, to vary the effective voltage which reaches the amplifier.

Wherever I refer in this specification or its claims to the mechanical operation of my resilient members, I wish the term "mechanical" to be taken in its dictionary sense, to wit: "of or pertaining to mechanics on the physical side."

In this invention I make use of tuning forks and also of reeds as resilient vibrating members. Tuning forks, by the exercise of great care in construction, can be made to give an almost perfectly simple tone, but for all ordinary purposes set forth herein, the cheaper commercial fork is usually pure enough, even without special treatment. Reeds, however, normally have upper partials, and these may well be suppressed to a negligible degree in the more expensive types of instruments embodying this invention. This may be accomplished in a variety of ways, one of the simplest being the use upon the reeds of properly placed riders. Indeed, I prefer to use these riders also on forks where lack of care in their construction permits them to show partials, above their primes, of sufficient prominence to be objectionable. These riders not only tend to suppress everything save the first partial, but they may also be used at the same time for at least roughly tuning the reeds and forks to which they are attached. If still finer tuning be desired, this may be accomplished by the screws 25.

The term "free" employed herein as descriptive of the character of the aforestated fork or reed shall mean a member, presumably resilient and tuned, which is not loaded, hampered, or distorted by any of the freedom-destroying impedimenta. Said fork or reed should be free in order to keep its wave-form, and to be responsive enough to build up a reasonable amplitude. It should be unimpeded that it may so be free, and further, that connections with externals shall not put dissonant or other undesirable partials into the fork or reed. It should be continuously vibrated, because it must be immediately responsive on the one hand, and because since the same member may be used for the fundamental of one note, and simultaneously for partials of several other notes, these partials must be instantaneously available; and for the further reason that the coming-in of a fork beginning to vibrate would destroy the expression of the music, because of the built-up tendency during a short interval of time.

In Figure 7 I depict for simplicity of showing a draw-stop mechanism which operates to decrease the volume of its particular tonal component as it is drawn toward the player. In organ practice, the tones controlled by stops commonly increase as the stops are drawn toward the player, and I wish it distinctly understood that I shall, in most cases, arrange to conform to this practice without in any wise departing from the principles illustrated in Figure 7, and there shown in the simplest and most understandable way possible.

It will be noted that the drawings of this application show an electrical lay-out by which the volume-level at any one time, other things equal, is proportional to the number of notes simultaneously struck. This system, in this respect, produces the type of keyboard music with which the public is familiar and for which performers have developed a technique.

There is, however, a way of keeping the volume- or loudness-level constant, other things equal, quite regardless of the number of notes simultaneously sounded, and this makes it possible for a composer to use complex harmonies even in passages he desires rendered extremely pianissimo.

This way I have shown in a companion-application, Serial No. 55,774, and I wish it distinctly understood that I may use in connection with the instant disclosure either the wiring lay-out shown and described herein, or any other suitable lay-out, including that just referred to as forming a part of my companion-application.

I claim as my invention:

1. An oscillation producing device for musical instruments comprising a permanent magnet having pole pieces between which is a hollow pickup coil; a free reed extending through the coil and disposed between said pole pieces; means for continuously oscillating the reed for periodic excitation of the coil, and means from which oscillations generated by the reed and picked up by the coil can simultaneously be distributed therefrom.

2. In a musical instrument, an alternator assembly for producing individual alternating voltages at different tone frequencies and of sinusoidal waveform, said assembly comprising free reeds, each continuously vibrating at an assigned tone frequency; and a series of electromagnetic pick-up devices, one associated with each reed, to pick up vibrations therefrom and convert same into sinusoidal alternating voltage of the frequency denoted by the reed, said pick-up devices being spacially and angularly related with respect to each other, the degree of angularity of adjacent pick-up devices being such as to prevent inductive coupling between them, thereby preventing distortion of the individually produced sinusoidal voltages.

3. In a musical instrument, similar reed assemblies, there being one such assembly for each note of the octave, each assembly comprising a set of continuously driven vibratile members adapted respectively to vibrate at tone frequencies corresponding to the vibrational frequencies of all the instrument's notes of the latter denoted by said assembly; means for converting the vibrations into alternating voltages of corresponding tone frequencies; an air chamber common to the reeds of all assemblies; means mounting the reeds to expose all thereof to the direct effect of air in said chamber; a source of air supply for feeding said chamber; means for maintaining a constant pressure of air at said source; and means for controlling admission of air to said chamber from said source.

4. In a musical instrument, means for producing alternating voltage of predetermined tone frequency and sinusoidal waveform, said means comprising an air chamber; a coil having a magnetized core, a tip of which extends into said chamber, a wall of said air chamber having an opening coaxial with the core; a free reed; and an armature of magnetized metal carried by the reed and closely fitting said opening and adapted to be continuously reciprocated pneumatically at a rate periodically to vary the reluctance of the magnetic field of the coil and produce alternating voltage of said predetermined frequency and sinusoidal waveform.

5. In a musical instrument, means for producing alternating voltage of predetermined tone frequency and sinusoidal waveform, said means comprising an air chamber; a coil having a magnetized core, a tip of which extends into said air chamber, a wall of said air chamber having an opening coaxial with the core; a free reed; an armature of magnetized metal carried by the reed and closely fitting said opening and adapted to be continuously reciprocated pneumatically at a rate periodically to vary the reluctance of the magnetic field of the coil and produce alternating voltage of said predetermined frequency and sinusoidal waveform; and means for tuning said reed.

6. In a musical instrument, means for producing alternating voltage of predetermined tone frequency and sinusoidal waveform, said means comprising an air chamber; a coil having a magnetized core, a tip of which extends into said air chamber, a wall of said air chamber having an opening coaxial with said core; a free reed; an armature of magnetized metal carried by the reed and closely fitting said opening and adapted to be continuously reciprocated pneumatically at a rate periodically to vary the reluctance of the magnetic field of the coil and produce alternating voltage of said predetermined frequency and sinusoidal waveform; and means enabling adjustment of the armature relative to the tip of the core to prevent the former from contacting the latter on its stroke towards same.

7. In a musical instrument, means for producing alternating voltage of predetermined tone frequency and sinusoidal waveform; a frame having angularly disposed arms; a coil mounted upon one of said arms and having a magnetized core, a tip of which is exposed from an end of the coil; a free reed hung from the other arm and having an amature of magnetized metal coaxial with and always axially spaced apart from the tip of said core; and means enabling relative adjustment between the tip of the core and said armature to thereby control the axial dimensions of the space between the tip and the armature and prevent the armature from striking the core during vibration of said reed.

8. In a musical instrument, means for producing alternating voltage of predetermined tone frequency and sinusoidal waveform; a frame having angularly disposed arms; a coil mounted upon one of the arms and having a magnetized core, a tip of which is exposed from an end of the coil; a free reed hung from the other arm and having an armature of magnetized metal coaxial with and always axially spaced apart from the tip of the core; means enabling relative axial adjustment between the tip of the core and said armature to thereby control the axial dimensions of the space between the tip and the armature and present the armature from striking the core during vibration of the reed; and means for absorbing vibrations generated in the frame by and during continuous vibration of the reed to thereby prevent distortion of the waveform of voltage produced as aforesaid.

9. In an electrical musical instrument, a plurality of alternators for producing alternating voltages at harmonically related tone frequencies and sinusoidal waveform; each alternator comprising a vibratory member continuously vibrated at an assigned tone frequency; means associated therewith to pick up vibrations therefrom and convert same into alternating voltage of sinusoidal waveform; means adjustably relating the vibratory member to said pick-up means to limit its movement with respect to and prevent it from striking the pick-up means during vibration of said member; and means non-resonantly relating said pick-up means to said vibratory member.

10. An electrical musical instrument comprising a plurality of pick-up coils, each coil having a magnetized core, a tip of which is exposed from an end of the coil; a reed of magnetized metal for each coil; means for disposing the free end of each reed a predetermined axial distance from the tip of the magnetized core of an associated coil calculated to prevent the reed from striking said tip during continuous vibration of said reed; means for continuously vibrating the reeds, each at a rate periodically to vary the reluctance of the magnetic field of an associated coil and cause development of alternating voltage of predetermined tone frequency and sinusoidal waveform; means enabling simultaneous conduction of alternating voltage through different output leads from each coil; means by which any desired number of said output leads can be connected in closed circuit in an electrical network employing means for converting said alternating voltage into audible sound; and an electrical resistance in each of said output leads such that the flow of voltage from the coil will be equal in all of said leads.

11. In an electrical musical instrument, a plurality of continuously operating alternators, each producing alternating voltage of predetermined tone frequency; an electrical network having a system of bus-bars; playing keys, each key having a plurality of circuit making and breaking devices adapted upon depression of a key to make closed circuit connections between respective bus-bars and certain alternators and enable conduction to said bus-bars of alternating voltages respectively corresponding to the fundamental tone frequency of the note denoted by the depressed key and certain partials of said fundamental; a plurality of individually variable, intensity grading, induction coils, each having a movable primary electrically connected to one of the bus-bars; a transformer connected in parallel with said induction coils by a common conductor; and an output circuit coupled to the secondary winding of said transformer and including a vacuum tube amplifier and a loud speaker actuable by said amplifier.

12. An electrical musical instrument comprising a plurality of pick-up coils, each coil having a magnetized core, a tip of which is exposed from an end of the coil; a reed of magnetized metal for each coil; means for adjustably disposing the free end of each reed a predetermined axial distance from the tip of the magnetized core of an associated coil calculated to prevent the reed from striking said tip during vibration of said reed; means for continuously vibrating the reeds, each at a rate periodically to vary the reluctance of the magnetic field of an associated coil and cause development of alternating voltage of predetermined tone frequency and sinusoidal waveform; means non-resonantly relating said coil to the reed; means for selecting, grading and grouping together certain of the developed alternating voltages to produce a complex waveform; means for amplifying said alternating voltages; and means for converting said complex waveform into audible sound.

13. In an electrical musical instrument, an electrical network having an expression-controlling potentiometer; a loud speaker and a vacuum tube amplifier for actuating the loud speaker; a transformer, the secondary winding of which is coupled to the loud speaker through the potentiometer; a plurality of reeds of magnetized metal, there being one such reed for each note of the musical scale; means for continuously vibrating each reed at a tone frequency denoted by the reed's position in said scale; a pick-up coil for each reed, each coil having a magnetized core; means for adjustably mounting each reed to provide a gap between same and the core; the axial dimensions of which are calculated to prevent the reed from striking the core during vibration of the reed; means non-resonantly relating said pick-up coil to the reed; resisted branched circuits from each coil; playing keys, a system of bus-bars; means actuable by the playing keys for controlling conduction of voltage to certain of the bus-bars from said resisted branched circuits; means for grading the strength of the voltage conducted over any bus-bar; and means for combining the voltages and impressing same upon the primary winding of said transformer.

MELVIN L. SEVERY.